US012799773B2

(12) United States Patent
Huang

(10) Patent No.: US 12,799,773 B2
(45) Date of Patent: Nov. 17, 2026

(54) LATCH ASSEMBLY

(71) Applicant: TAIWAN FU HSING INDUSTRIAL CO., LTD., Kaohsiung City (TW)

(72) Inventor: Chao-Ming Huang, Kaohsiung City (TW)

(73) Assignee: TAIWAN FU HSING INDUSTRIAL CO., LTD., Kaohsiung City (TW)

( * ) Notice: Subject to any disclaimer, the term of this patent is extended or adjusted under 35 U.S.C. 154(b) by 0 days.

(21) Appl. No.: 19/057,242

(22) Filed: Feb. 19, 2025

(65) Prior Publication Data

US 2025/0320750 A1 Oct. 16, 2025

(30) Foreign Application Priority Data

Apr. 12, 2024 (TW) ................................ 113203645

(51) Int. Cl.
*E05B 17/00* (2006.01)
*E05B 9/02* (2006.01)
*E05B 15/00* (2006.01)

(52) U.S. Cl.
CPC ............ *E05B 17/0004* (2013.01); *E05B 9/02* (2013.01); *E05B 15/0013* (2013.01)

(58) Field of Classification Search
CPC .... E05B 17/0004; E05B 17/04; E05B 17/041; E05B 9/02; E05B 9/04; E05B 15/0013; E05B 15/02; E05B 2009/047; E05B 2015/0265; Y10T 292/0971; Y10T 292/0974; Y10T 292/0975; Y10T 292/0972; Y10T 292/1079; Y10T 292/0976; Y10T 292/0994; Y10T 292/0995; E05C 1/163
See application file for complete search history.

(56) References Cited

U.S. PATENT DOCUMENTS 1,829,815 A * 11/1931 Schlage .................. E05C 1/163 292/169.22
2,420,083 A * 5/1947 Lickteig .................. E05C 1/163 292/169.18

(Continued)

FOREIGN PATENT DOCUMENTS

KR 200267030 Y1 * 3/2002 ............. E05B 15/10
KR 100445145 B1 * 8/2004 ......... E05B 63/0056

*Primary Examiner* — Steven A Tullia
(74) *Attorney, Agent, or Firm* — MUNCY, GEISSLER, OLDS & LOWE, P.C.

(57) ABSTRACT

A latch assembly includes a latch bolt module and a driving module. The latch bolt module includes a latch bolt cylinder, a latch bolt movably arranged on the latch bolt cylinder, a connecting plate connected to the latch bolt, and a linkage piece engaged with the connecting plate and formed with a notch. The driving module includes a driving plate abutting against the linkage piece, a driving member, and a housing having a first covering plate and a second covering plate. The first covering plate is formed with an extension structure bent relative to the first covering plate and passing through the notch. When the driving member is rotated, the driving plate is moved to drive the linkage piece to swing, such that the linkage piece drives the latch bolt to move relative to the latch bolt cylinder from an extended position to a retracted position through the connecting plate.

12 Claims, 11 Drawing Sheets

(56) References Cited

U.S. PATENT DOCUMENTS

| | | | | |
|---|---|---|---|---|
| 2,662,386 | A * | 12/1953 | Hillgren | E05B 55/005<br>70/479 |
| 2,687,319 | A * | 8/1954 | Quigley | E05C 1/163<br>292/169.18 |
| 4,118,055 | A * | 10/1978 | Bischoff, Jr. | E05C 1/163<br>292/165 |
| 4,711,477 | A * | 12/1987 | Fann | E05B 63/06<br>292/DIG. 60 |
| 4,746,154 | A * | 5/1988 | Fang | E05B 63/06<br>292/1 |
| 5,570,912 | A * | 11/1996 | Mullich | E05B 63/06<br>292/1.5 |
| 6,257,630 | B1 * | 7/2001 | Huang | E05B 63/06<br>292/1.5 |
| 6,293,597 | B1 * | 9/2001 | Huang | E05B 63/06<br>292/1.5 |
| 6,334,635 | B1 * | 1/2002 | Huang | E05B 63/06<br>292/DIG. 60 |
| 6,536,248 | B1 * | 3/2003 | Fan | E05C 1/163<br>292/169.18 |
| 6,536,816 | B1 * | 3/2003 | Fan | E05B 63/06<br>292/1.5 |
| 6,688,660 | B2 * | 2/2004 | Huang | E05B 63/06<br>292/DIG. 60 |
| 7,641,243 | B2 * | 1/2010 | Yuan | E05B 63/06<br>292/DIG. 60 |
| 10,513,872 | B2 * | 12/2019 | Kumar | E05B 63/06 |
| 11,585,115 | B2 * | 2/2023 | Chen | E05C 1/12 |
| 2003/0173785 | A1 * | 9/2003 | Huang | E05B 55/005<br>292/1.5 |

* cited by examiner

LATCH ASSEMBLY

BACKGROUND OF THE INVENTION

1. Field of the Invention

The present invention relates to a latch assembly, and more particularly, to a latch assembly with improved structure.

2. Description of the Prior Art

Generally, a latch assembly of a lock is connected to a handle through a driving shaft. When a user presses or turns the handle, the handle drives the latch bolt of the latch assembly to move to a retracted position through the driving shaft, in order to allow the user to open the door. In order to meet various usage requirements, latch assemblies of the prior art are designed with different configurations. For example, some latch assembly of the prior art is arranged with a small angle driving mechanism in order to retract the latch bolt by turning the handle at a smaller angle; and some latch assembly of the prior art is arranged with an adjustable installation mechanism in order to install the latch assembly on door panels with different lock backsets. However, the structure of the latch assembly of the prior art is complex and may not function properly due to poor assembly or component dimensional tolerances.

SUMMARY OF THE INVENTION

The present invention provides a latch assembly.

A latch assembly of the present invention comprises a latch bolt module and a driving module. The latch bolt module comprises a latch bolt cylinder, a latch bolt, a connecting plate, and a linkage piece. The latch bolt is movably arranged on the latch bolt cylinder along an axial direction of the latch bolt cylinder. The connecting plate is connected to the latch bolt. The linkage piece is engaged with the connecting plate and formed with a notch. One end of the linkage piece is configured to abut against the latch bolt cylinder. The driving module comprises a driving plate, a driving member, and a housing. The driving plate is configured to abut against the linkage piece. The driving member is formed with a driving shaft hole to allow a driving shaft to penetrate through. The housing is connected to the latch bolt cylinder and configured to accommodate the driving plate and the driving member. The housing has a first covering plate and a second covering plate. One end of a main body of the first covering plate is formed with an extension structure bent at a predetermined angle relative to the main body of the first covering plate and configured to pass through the notch. When the driving member is driven by the driving shaft to rotate, the driving plate is moved to drive the linkage piece to swing, such that the linkage piece is configured to drive the latch bolt to move relative to the latch bolt cylinder from an extended position to a retracted position through the connecting plate.

In an embodiment of the present invention, the extension structure comprises a first extension section bent at the predetermined angle relative to the first covering plate, and a second extension section that extended toward the latch bolt from the first extension section along the axial direction of the latch bolt cylinder.

In an embodiment of the present invention, the first extension section is configured to pass through the notch and abut against a bottom of the notch.

In an embodiment of the present invention, the predetermined angle is between 2 degrees and 5 degrees.

In an embodiment of the present invention, the latch assembly further comprises a spindle-shaped spring sleeved on the extension structure and configured to abut against the latch bolt and the housing.

In an embodiment of the present invention, the connecting plate is formed with a V-shaped notch configured to be engaged with the latch bolt.

In an embodiment of the present invention, the connecting plate has a first side and a second side opposite to each other, the first side faces towards the driving plate and is formed with a protruded structure, and the second side is formed with a recessed structure.

In an embodiment of the present invention, the second covering plate is formed with at least one groove, the driving plate has at least one first pushed structure and at least one second pushed structure configured to abut against the at least one groove. When the driving member is located at a first driving position relative to the housing and when the driving member is rotated, the driving member is configured to push the first pushed structure to move the driving plate. When the driving member is located at a second driving position relative to the housing and when the driving member is rotated, the driving member is configured to push the second pushed structure to move the driving plate.

In an embodiment of the present invention, the latch assembly further comprises an extension housing movably arranged on the housing and configured to move the driving member relative to the housing between the first driving position and the second driving position. The housing is formed with at least one first positioning structure and at least one second positioning structure. The extension housing is formed with at least one extension positioning structure. When the driving member is located at the first driving position relative to the driving plate, the first positioning structure is configured to be engaged with the extension positioning structure. When the driving member is located at the second driving position relative to the driving plate, the second positioning structure is configured to be engaged with the extension positioning structure.

In an embodiment of the present invention, the second covering plate is formed with an opening, and a hole wall of the opening is formed with a guiding structure. When the driving member is at an initial angle relative to the guiding structure, the driving member is movable between the first driving position and the second driving position relative to the housing. When the driving member is not at the initial angle relative to the guiding structure, the driving member is configured to be blocked by the guiding structure to prevent the driving member from being moved between the first driving position and the second driving position relative to the housing.

In an embodiment of the present invention, the latch assembly further comprises an anti-theft module. The anti-theft module comprises an anti-theft bolt, a blocking member, an anti-theft spring, and a positioning pin. The anti-theft bolt is movable relative to the latch bolt, and the anti-theft bolt is formed with a rectangular groove. The blocking member is formed with a rectangular opening. The anti-theft spring has two opposite ends respectively abutting against the anti-theft bolt and the blocking member. The positioning pin has a rectangular cross-section corresponding to the rectangular groove and the rectangular opening. The positioning pin is configured to pass through the rectangular opening. When the anti-theft bolt is moved to a predetermined position relative to the latch bolt, the blocking member is configured to swing to prevent the latch bolt from being moved from the extended position to the retracted position relative to the latch bolt cylinder.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
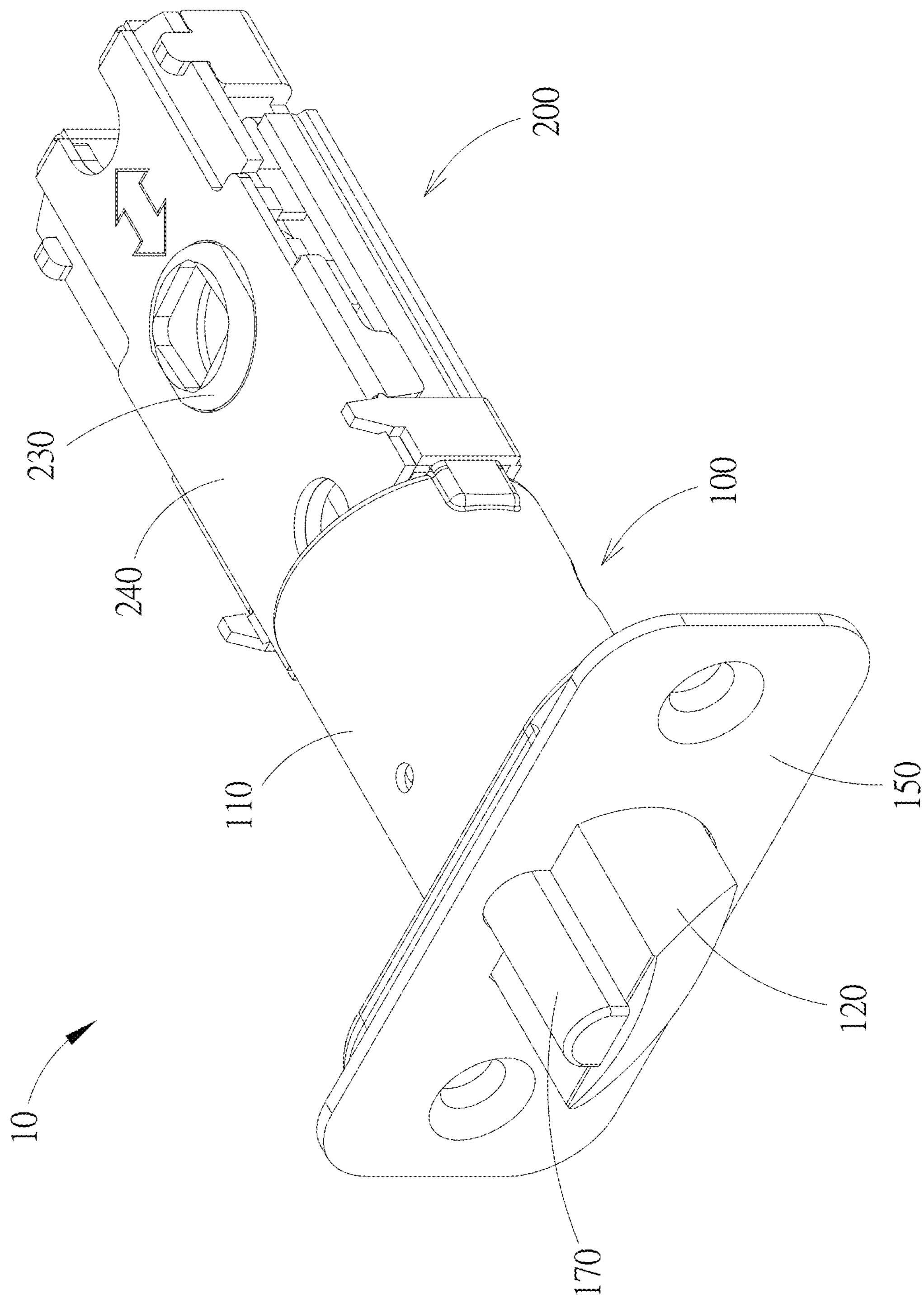
FIG. 1 is a diagram showing a latch assembly of the present invention.
Figure 2:
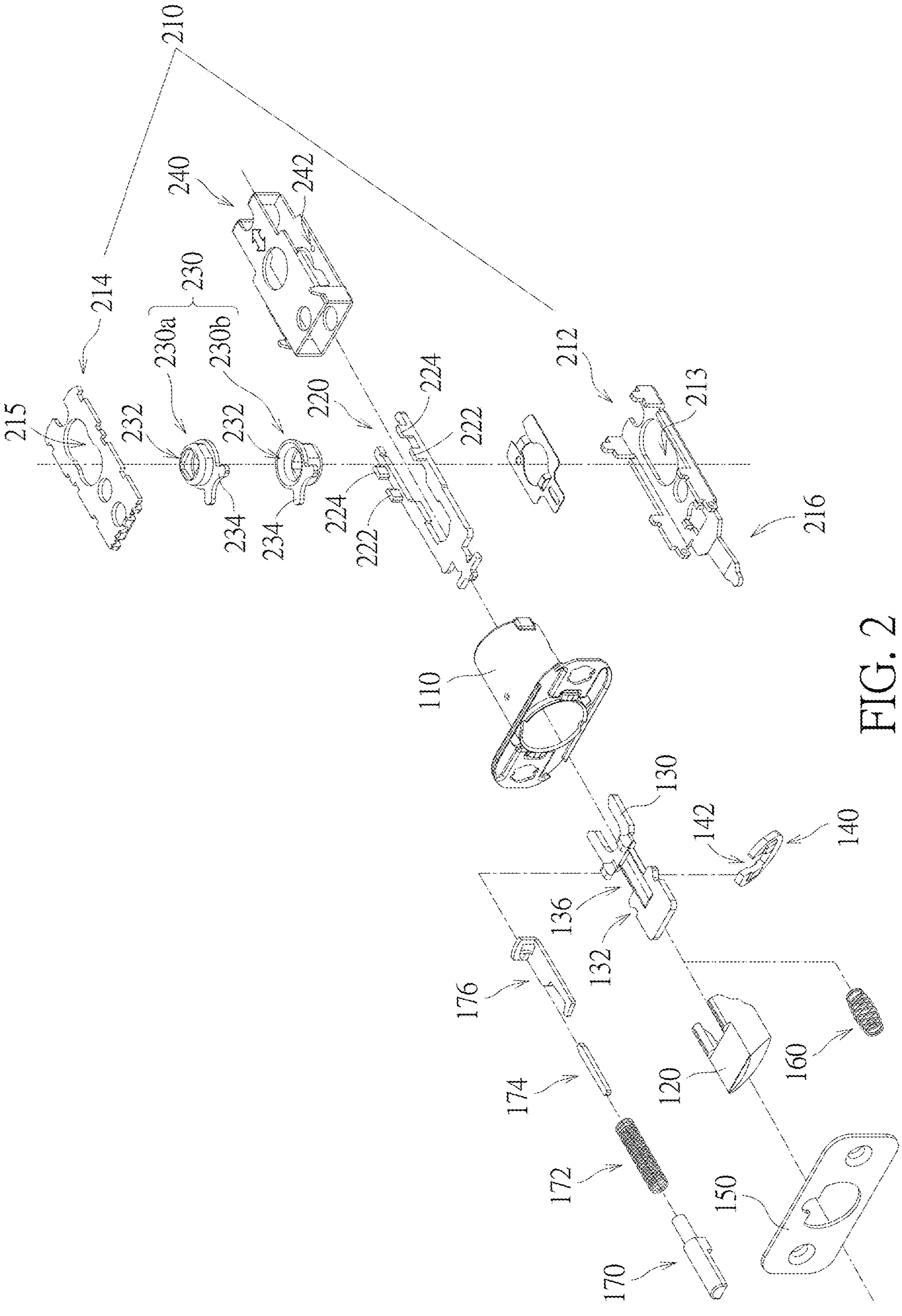
FIG. 2 is an exploded view of the latch assembly of the present invention.
Figure 3:
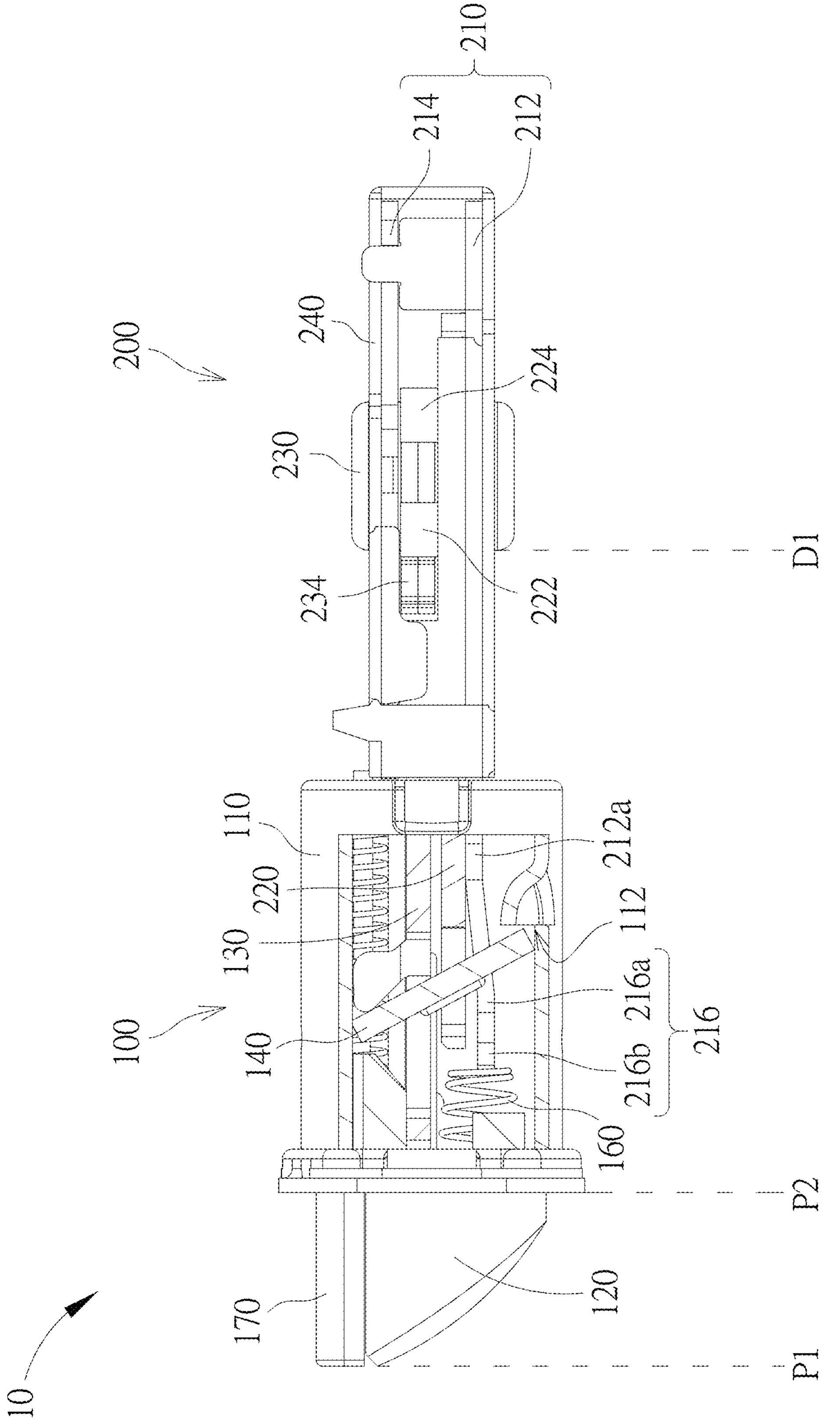
FIG. 3 is a diagram showing the latch assembly of the present invention before being extended.
Figure 4:
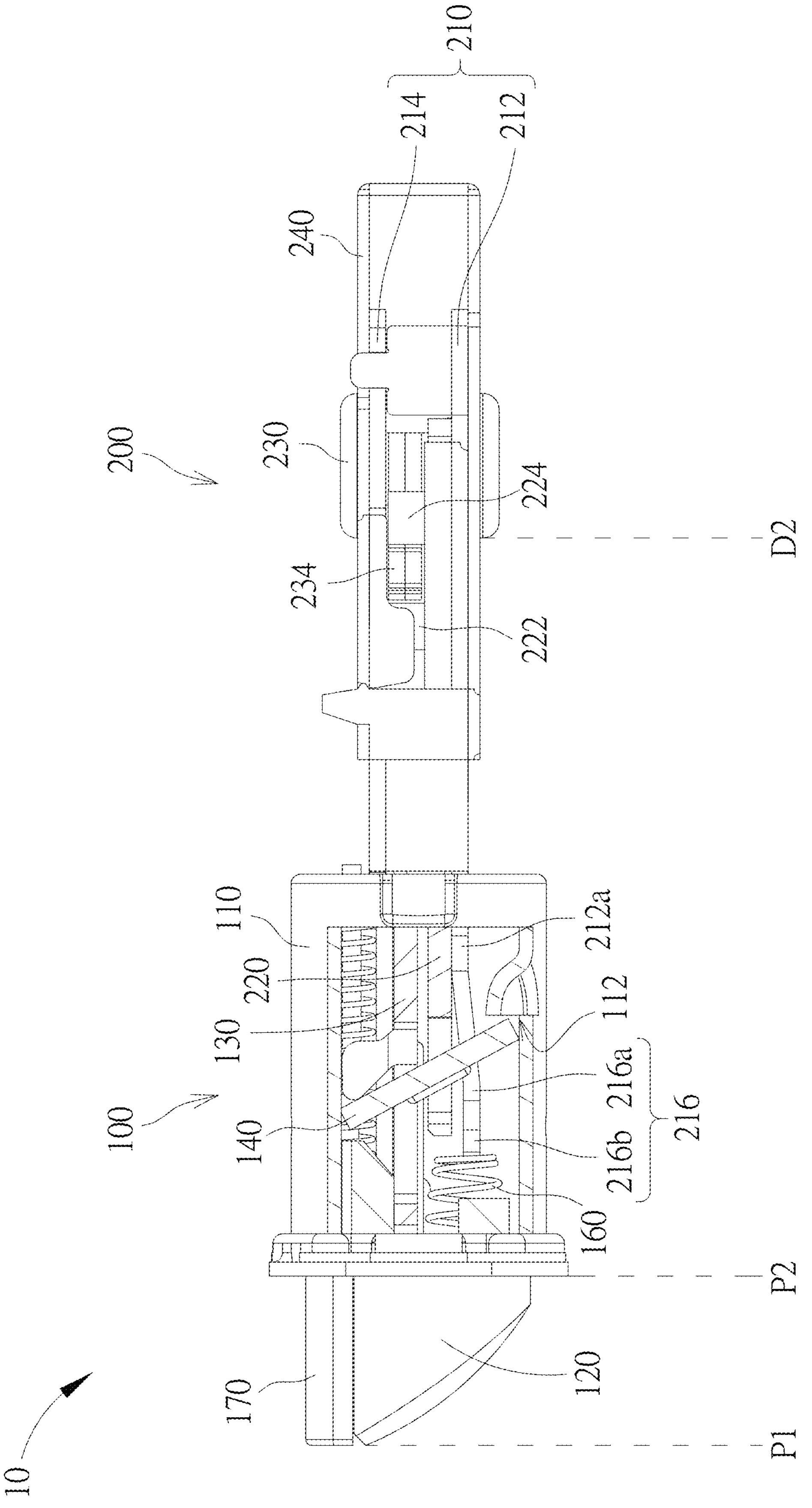
FIG. 4 is a diagram showing the latch assembly of the present invention after being extended.

Please refer to FIG. 1 to FIG. 4. FIG. 1 is a diagram showing a latch assembly of the present invention, FIG. 2 is an exploded view of the latch assembly of the present invention, FIG. 3 is a diagram showing the latch assembly of the present invention before being extended, and FIG. 4 is a diagram showing the latch assembly of the present invention after being extended. For convenience of illustrating internal structure of the latch assembly 10 of the present invention, the latch assembly 10 in FIG. 3 and FIG. 4 is partially sectioned. As shown in the figures, the latch assembly 10 of the present invention comprises a latch bolt module 100 and a driving module 200. The latch bolt module 100 comprises a latch bolt cylinder 110, a latch bolt 120, a connecting plate 130, and a linkage piece 140. The latch bolt 120 is movably arranged on the latch bolt cylinder 110 along an axial direction of the latch bolt cylinder 110. The latch bolt 120 is movable between an extended position P1 and a retracted position P2 relative to the latch bolt cylinder 110. When a front end of the latch bolt 120 is located at the extended position P1, the latch bolt 120 is configured to be extended into a recess of a door frame (not shown in the figures) to prevent a door from being opened; when the front end of the latch bolt 120 is located at the retracted position P2, the latch bolt 120 is retracted into the latch bolt cylinder 110 to allow the door to be opened. The connecting plate 130 is fixedly connected to the latch bolt 120 to be synchronously moved with the latch bolt 120. The linkage piece 140 is engaged with the connecting plate 130, and the linkage piece 140 is formed with a notch 142. In addition, one end of the linkage piece 140 is configured to abut against the latch bolt cylinder 110. In the present embodiment of the present invention, one end of the linkage piece 140 is configured to abut against a recessed structure 112 of the latch bolt cylinder 110, but the present invention is not limited thereto. In the present invention, the latch bolt cylinder 110 can also be arranged with other types of structures (such as ribs) to abut against the end of the linkage piece 140.

On the other hand, the latch bolt module 100 can further comprise a fixing plate 150 and an elastic member 160. The fixing plate 150 is fixedly connected to the latch bolt cylinder 110, and configured to mount the latch assembly 10 on the door. The elastic member 160 is configured to provide an elastic force to push the latch bolt 120 to move toward the extended position P1.

The driving module 200 comprises a housing 210, a driving plate 220, and a driving member 230 (in the present embodiment of the present invention, the driving member 230 is composed of two driving units 230*a*, 230*b*, but the present invention is not limited thereto). The housing 210 is connected to the latch bolt cylinder 110. The housing 210 is configured to accommodate the driving plate 220 and the driving member 230. The housing 210 comprises a first covering plate 212 and a second covering plate 214 located at two opposite sides of the housing 210. The first covering plate 212 and the second covering plate 214 are respectively formed with an opening 213 and an opening 215. One end of a main body 212*a* of the first covering plate 212 is formed with an extension structure 216 configured to pass through the notch 142 of the linkage piece 140. The driving plate 220 is movably arranged on the housing 210 along the axial direction of the latch bolt cylinder 110, and one end of the driving plate 220 is configured to abut against the linkage piece 140. The driving plate 220 has at least one first pushed structure 222 and at least one second pushed structure 224 (in the present embodiment of the present invention, the driving plate 220 has two first pushed structures 222 and two second pushed structures 224, but the present invention is not limited thereto). The driving member 230 is formed with a driving shaft hole 232 and a driving structure 234. The driving shaft hole 232 is configured to allow a driving shaft (not shown in the figures) to penetrate through. The driving shaft is configured to be connected to an inner handle and an outer handle of the door. When a user turns the inner handle or the outer handle, the driving shaft is configured to drive the driving member 230 to rotate.

On the other hand, the driving module 200 further comprises an extension housing 240 movably arranged on the housing 210. The extension housing 240 is configured to move the driving member 230 between a first driving position D1 and a second driving position D2 relative to the housing 210. When the driving member 230 is located at the first driving position D1 relative to the housing 210 (as shown in FIG. 3), the driving structure 234 of the driving member 230 corresponds to the first pushed structure 222 of the driving plate 220. When the driving member 230 is located at the second driving position D2 relative to the housing 210 (as shown in FIG. 4), the driving structure 234 of the driving member 230 corresponds to the second pushed structure 224 of the driving plate 220.

When the driving member 230 is located at the first driving position D1 relative to the housing 210 and when the driving member 230 is rotated by the driving shaft, the driving structure 234 of the driving member 230 is configured to push the first pushed structure 222 of the driving plate 220 in order to move the driving plate 220 away from the latch bolt cylinder 110 along the axial direction of the latch bolt cylinder 110; and when the driving member 230 is located at the second driving position D2 relative to the housing 210 and when the driving member 230 is rotated by the driving shaft, the driving structure 234 of the driving member 230 is configured to push the second pushed structure 224 of the driving plate 220 in order to move the driving plate 220 away from the latch bolt cylinder 110 along the axial direction of the latch bolt cylinder 110. When the driving plate 220 is moved along the axial direction of the latch bolt cylinder 110, one end of the driving plate 220 is configured to pull the linkage piece 140, so as to swing the linkage piece 140 (along the clockwise direction in FIG. 3 and FIG. 4) by using the recessed structure 112 of the latch bolt cylinder 110 as the fulcrum. When the linkage piece 140 is swung, the linkage piece 140 is configured to pull the connecting plate 130 along the axial direction of the latch bolt cylinder 110, in order to further move the latch bolt 120 from the extended position P1 to the retracted position P2 relative to the latch bolt cylinder 110. As such, the user can open the door.

According to the above arrangement, the present invention provide a leverage mechanism between the driving plate 220, the linkage piece 140, and the connecting plate 130 to move the latch bolt 120, and a moving distance of the driving plate 220 is smaller than that of the connecting plate 130. Therefore, the latch assembly 10 of the present invention allows the user to retract the latch bolt 120 into the latch bolt cylinder 110 by turning the inner handle or the outer handle at a smaller angle. In addition, the extension housing 240 of the latch assembly 10 of the present invention can move the driving member 230 between the first driving position D1 and the second driving position D2 relative to the housing 210, such that the driving shaft hole 232 of the driving member 230 can correspond to positions of different handle installation holes on the door. In other words, the latch assembly 10 of the present invention can be applied to door panels with different lock backsets (installation distances from door edges).

On the other hand, when the user releases the inner handle or the outer handle, the inner handle or the outer handle is configured to be rotated back to the initial position. Moreover, since the elastic member 160 abuts against the latch bolt 120 and the housing 210, the elastic force of the elastic member 160 is configured to push the latch bolt 120 to move the latch bolt 120 from the retracted position P2 to the extended position P1.

Figure 5:
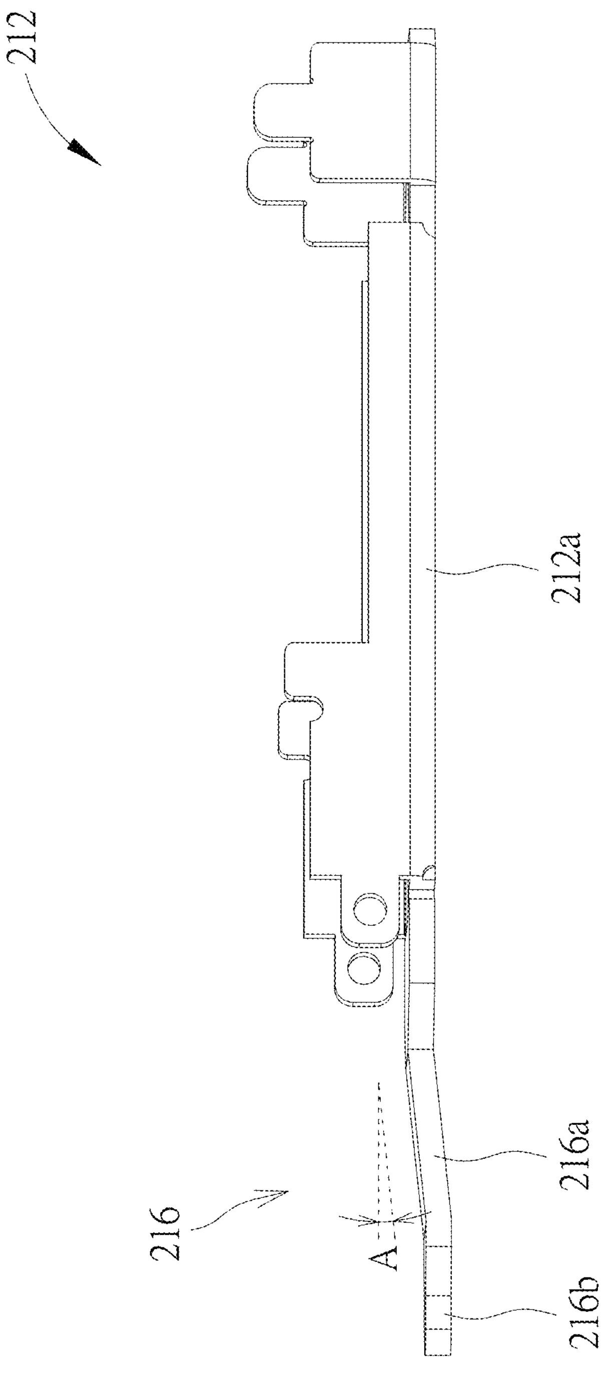
FIG. 5 is a diagram showing a first covering plate of the latch assembly of the present invention.
Figure 6:
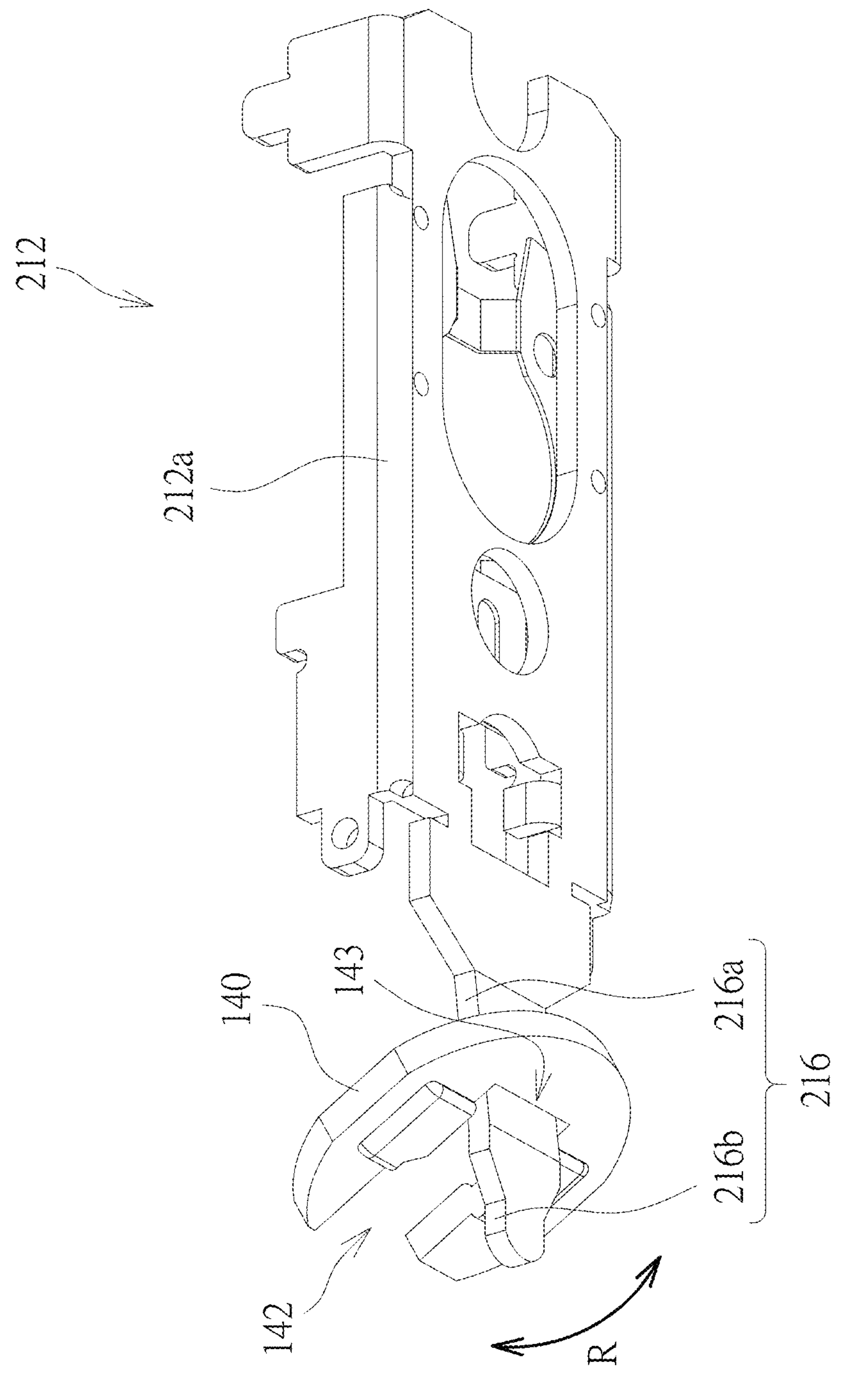
FIG. 6 is a diagram showing the first covering plate and a linkage piece of the latch assembly of the present invention.
Figure 7:
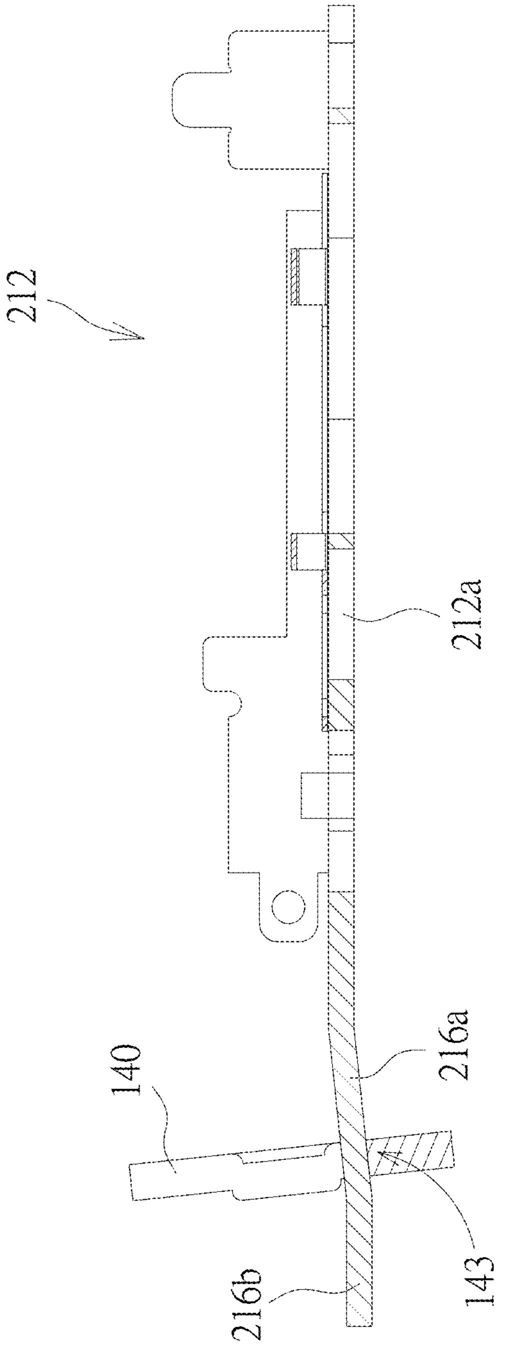
FIG. 7 is a cross-sectional view of the first covering plate and the linkage piece of the latch assembly of the present invention.

Please refer to FIG. 5 to FIG. 7, and refer to FIG. 1 to FIG. 4 as well. FIG. 5 is a diagram showing the first covering plate 212 of the latch assembly of the present invention, FIG. 6 is a diagram showing the first covering plate 212 and the linkage piece 140 of the latch assembly of the present invention, and FIG. 7 is a cross-sectional view of the first covering plate 212 and the linkage piece 140 of the latch assembly of the present invention. As shown in the figures, the extension structure 216 of the first covering plate 212 comprises a first extension section 216*a* and a second extension section 216*b*. The first extension section 216*a* is bent at a predetermined angle A relative to the main body 212*a* of the first covering plate 212. The second extension section 216*b* is extended toward the latch bolt 120 from the first extension section 216*a* along the axial direction of the latch bolt cylinder 110. In the present embodiment of the present invention, the predetermined angle A is between 2 degrees and 5 degrees, but the present invention is not limited thereto. Preferably, the predetermined angle A is between 3 degrees and 4 degrees.

The first extension section 216*a* of the extension structure 216 of the first covering plate 212 is configured to pass through the notch 142 of the linkage piece 140 and abut against a bottom 143 of the notch 142. A surface of the bottom 143 of the notch 142 is extended along a width direction of the first extension section 216*a* to increase a contact area between the bottom 143 of the notch 142 and the first extension section 216*a*. When the linkage piece 140 is swung, the design of the first extension section 216*a* abutting against the bottom 143 of the notch 142 can prevent the linkage piece 140 from shaking left and right relative to the first extension section 216*a* along a direction R. Moreover, the design of the first extension section 216*a* being bent relative to the main body 212*a* of the first covering plate 212 can increase the contact area between the first extension section 216*a* and lateral surfaces of the notch 142, in order to prevent the linkage piece 140 from shaking up and down when the linkage piece 140 is swung, so as to increase stability of the linkage piece 140 when being swung. In addition, in the present embodiment of the present invention, the elastic member 160 is a spindle-shaped spring (as shown in FIG. 2 to FIG. 4) sleeved on the extension structure 216 and configured to abut against the latch bolt 120 and the housing 210, in order to provide the elastic force to push the latch bolt 120 to move toward the extended position P1. Moreover, the design of the first extension section 216*a* of the first covering plate 212 being bent at the predetermined angle A relative to the main body 212*a* of the first covering plate 212 can allow a larger space to be formed between the second extension section 216*b* and the connecting plate 130 for accommodating the elastic member 160.

Figure 8:
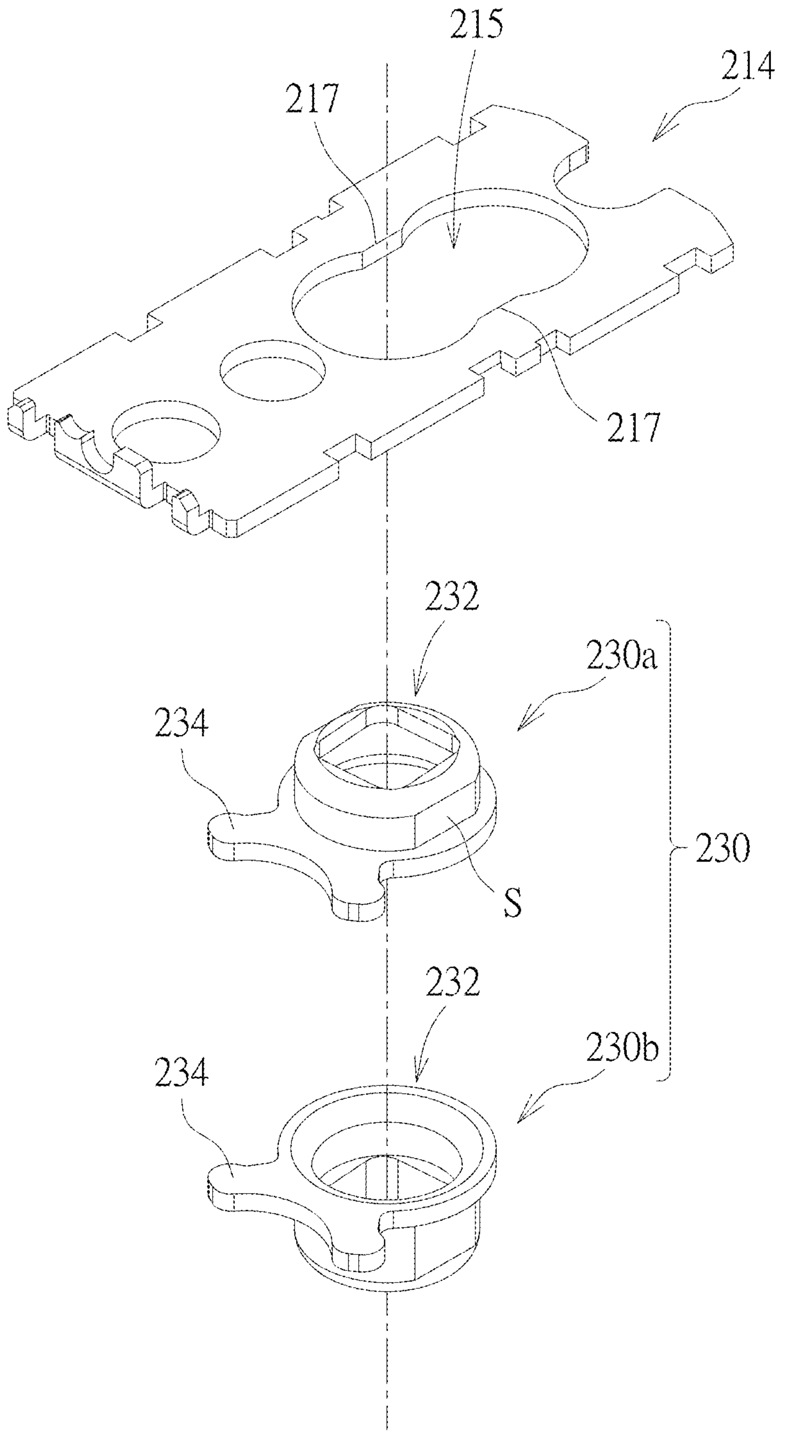
FIG. 8 is a diagram showing a second covering plate and the driving member of the latch assembly of the present invention.

Please refer to FIG. 8, and refer to FIG. 1 to FIG. 4 as well. FIG. 8 is a diagram showing the second covering plate 214 and the driving member 230 of the latch assembly of the present invention. As shown in the figures, a hole wall of the opening 215 of the second covering plate 214 is formed with a guiding structure 217 corresponding to a lateral surface S of the driving unit 230*a* of the driving member 230. When the driving member 230 is at an initial angle relative to the guiding structure 217 (before the driving member 230 being rotated), the lateral surface S of the driving unit 230*a* is parallel to a surface of the guiding structure 217, such that the driving member 230 is movable between the first driving position D1 and the second driving position D2 relative to the housing 210. When the driving member 230 is not at the initial angle relative to the guiding structure 217 (after the driving member 230 being rotated), the driving unit 230*a* is configured to be blocked by the guiding structure 217 in order to prevent the driving member 230 from being moved between the first driving position D1 and the second driving position D2 relative to the housing 210.

According to the above arrangement, the position of the driving member 230 of the latch assembly 10 of the present invention is only adjustable when the driving member 230 is not rotated. Moreover, when the driving member 230 is rotated, the guiding structure 217 can increase the stability of the driving member 230 when being rotated.

Figure 9:
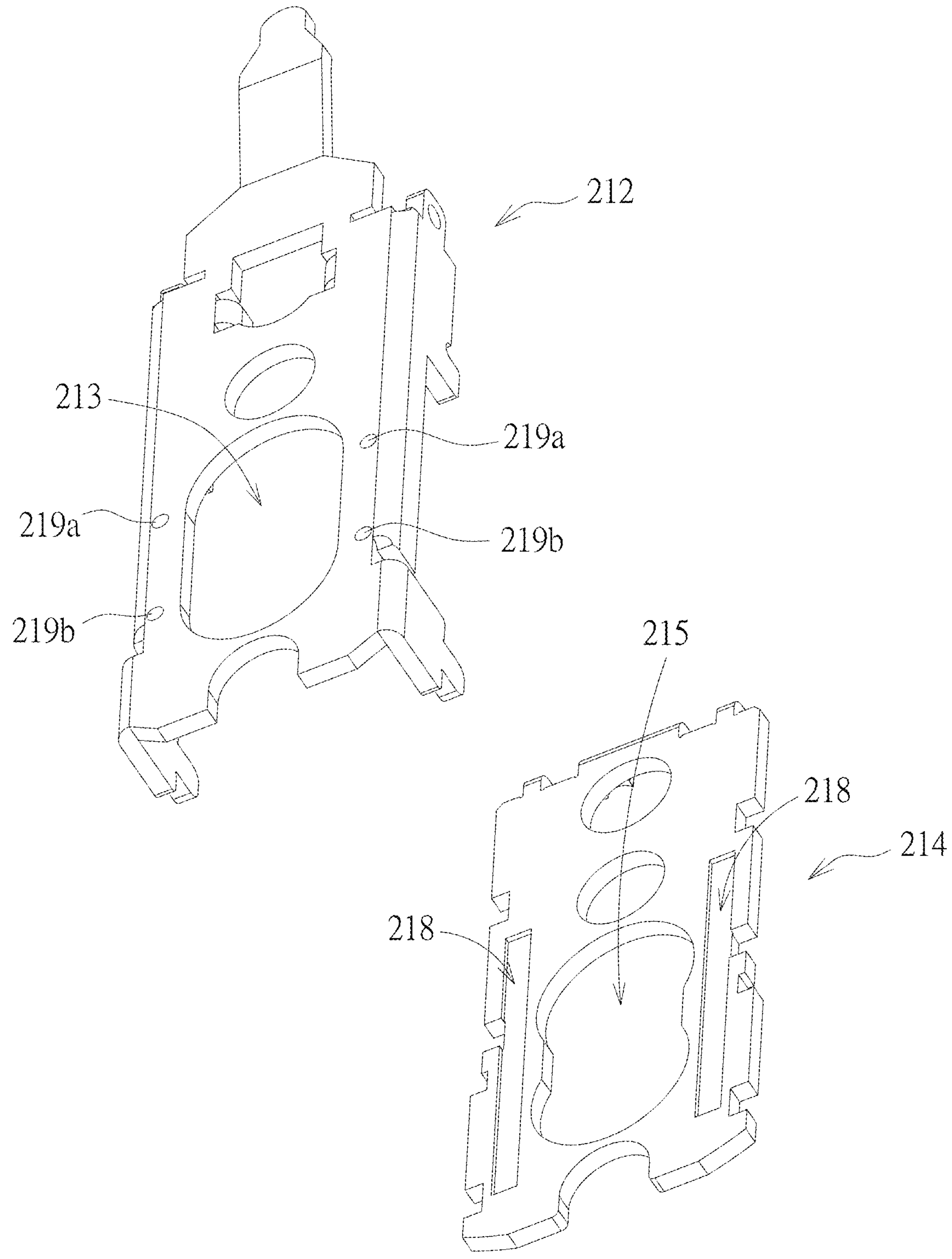
FIG. 9 is a diagram showing the first covering plate and the second covering plate of the latch assembly of the present invention.

Please refer to FIG. 9, and refer to FIG. 1 to FIG. 4 as well. FIG. 9 is a diagram showing the first covering plate 212 and the second covering plate 214 of the latch assembly of the present invention. As shown in the figures, the second covering plate 214 is formed with at least one groove 218. In the present embodiment of the present invention, the second covering plate 214 is formed with two grooves 218, but the present invention is not limited thereto. The first pushed structure 222 and the second pushed structure 224 of the driving plate 220 are configured to abut against the groove 218 of the second covering plate 214 (please also refer to FIG. 2). When the driving member 230 is rotated to push the driving plate 220, the groove 218 can increase stability of the driving plate 220 when being moved, in order to prevent the driving structure 234 of the driving member 230 from being detached from the first pushed structure 222 or the second pushed structure 224 of the driving plate 220 due to poor assembly or component dimensional tolerances (for example, the groove 218 can prevent a gap from being formed between the first pushed structure 222 or the second pushed structure 224 and the second covering plate 214 during the rotation of the driving member 230, where the gap may cause the driving structure 234 of the driving member 230 to pass through the gap to be detached from the first pushed structure 222 or the second pushed structure 224 of the driving plate 220). In addition, the first covering plate 212 is formed with at least one first positioning structure 219*a* and at least one second positioning structure 219*b* (as shown in FIG. 9), and the extension housing 240 is formed with at least one extension positioning structure 241 (as shown in FIG. 2). In the present embodiment of the present invention, the first covering plate 212 is formed with two first positioning structures 219*a* and two second positioning structures 219*b*, and the extension housing 240 is formed with two extension positioning structures 242 (only one extension positioning structure 242 is shown in FIG. 2 due to the view angle), but the present invention is not limited thereto. When the driving member 230 is located at the first driving position D1 relative to the driving plate 220, the first positioning structure 219*a* is configured to be engaged with the extension positioning structure 242; and when the driving member 230 is located at the second driving position D2 relative to the driving plate 220, the second positioning structure 219*b* is configured to be engaged with the extension positioning structure 242. In the present embodiment of the present invention, the first positioning structures 219*a* and the second positioning structures 219*b* are recessed structures, and the extension positioning structures 241 are protruded structures, but the present invention is not limited to this.

Figure 10:
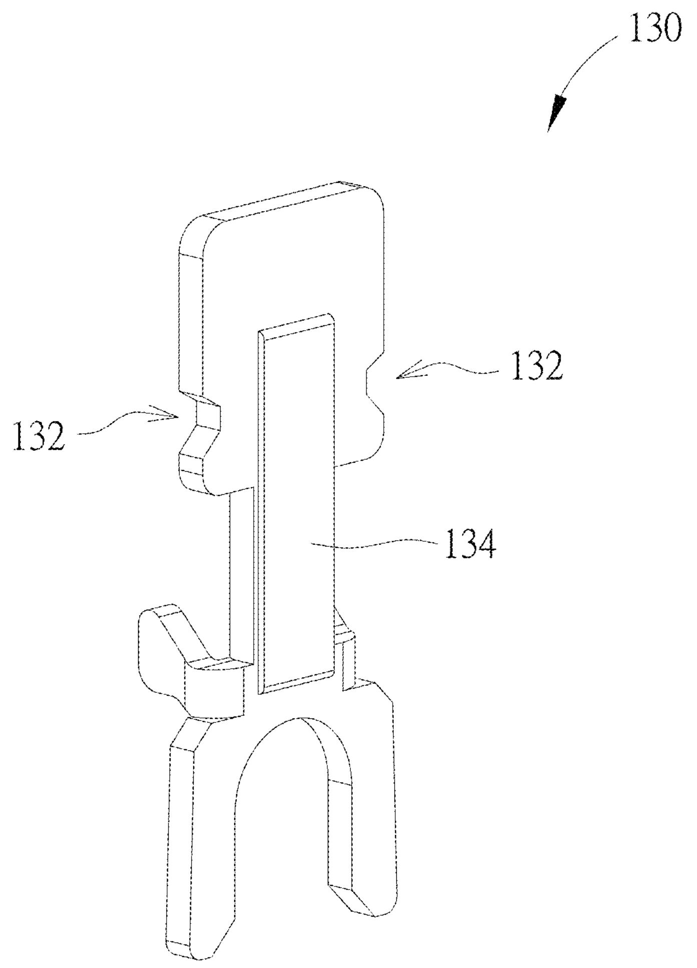
FIG. 10 is a diagram showing a connecting plate of the latch assembly of the present invention.

Please refer to FIG. 10, and refer to FIG. 1 to FIG. 4 as well. FIG. 10 is a diagram showing the connecting plate 130 of the latch assembly of the present invention. As shown in the figures, the connecting plate 130 is formed with a V-shaped notch 132 configured to be engaged with the latch bolt 120. For example, the latch bolt 120 can be riveted to the V-shaped notch 132 of the connecting plate 130 through stamping, in order to increase connection strength and stability between the connecting plate 130 and the latch bolt 120. In addition, the connecting plate 130 has a first side and a second side opposite to each other. The first side of the connecting plate 130 faces toward the driving plate 220 and is formed with a protruded structure 134 (as shown in FIG. 10), and the second side of the connecting plate 130 is formed with a recessed structure 136 (as shown in FIG. 2). The protruded structure 134 can reduce a contact area between the connecting plate 130 and the driving plate 220, so as to reduce friction between the connecting plate 130 and the driving plate 220 and increase structural strength of the connecting plate 130.

Figure 11:
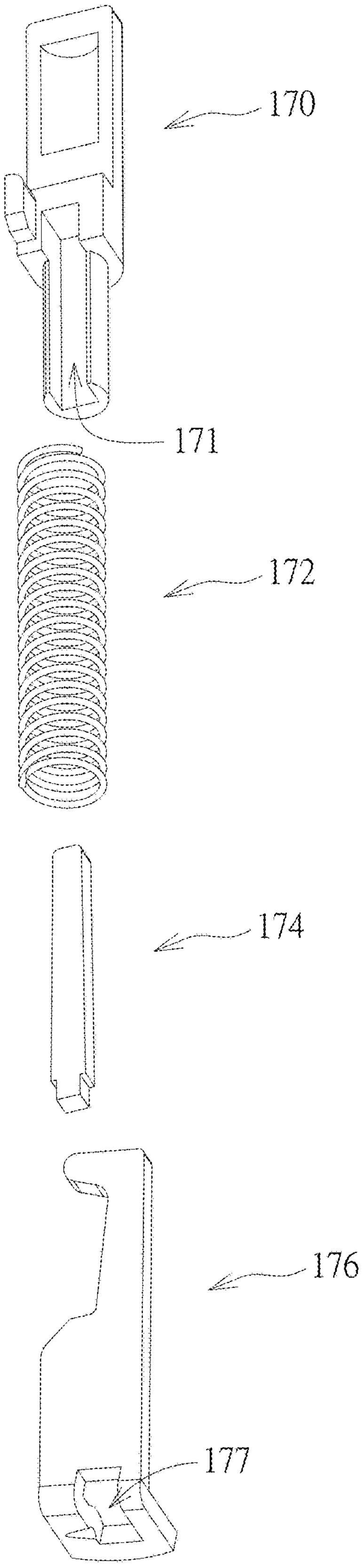
FIG. 11 is a diagram showing an anti-theft mechanism of the latch assembly of the present invention.

Please refer to FIG. 11, and refer to FIG. 1 to FIG. 4 as well. FIG. 11 is a diagram showing an anti-theft mechanism of the latch assembly of the present invention. As shown in the figures, the latch bolt module 100 can further comprise an anti-theft bolt 170, an anti-theft spring 172, a positioning pin 174, and a blocking member 176. The anti-theft bolt 170 is movable relative to the latch bolt 120, and the anti-theft bolt 170 is formed with a rectangular groove 171. The anti-theft spring 172 has two opposite ends configured to respectively abut against the anti-theft bolt 170 and the blocking member 176. The blocking member 176 is formed with a rectangular opening 177. The positioning pin 174 has a rectangular cross-section corresponding to the rectangular groove 171 of the anti-theft bolt 170 and the rectangular opening 177 of the blocking member 176, and the positioning pin 174 is configured to pass through the rectangular opening 177. When the anti-theft bolt 170 is moved to a predetermined position relative to the latch bolt 120 (when the anti-theft bolt 170 is pressed down relative to the latch bolt 120), the blocking member 176 is configured to swing to prevent the latch bolt 120 from being moved from the extended position P1 to the retracted position P2 relative to the latch bolt cylinder 110. The design of the positioning pin 174 with the rectangular cross-section of the present invention can increase stability of the anti-theft bolt 170 and the blocking member 176 during operation. On the other hand, the recessed structure 136 of the connecting plate 130 can increase moving space for the blocking member 176.

In contrast to the prior art, the latch bolt module 100 of the latch assembly 10 of the present invention has a leverage mechanism, which allows the user to open the door by turning the handle at a smaller angle. Moreover, the driving module 200 of the latch assembly 10 of the present invention can adjust the position of the driving shaft hole 232 of the driving member 230 to be applied to the door panels with different lock backsets. Moreover, the structure of the latch assembly 10 of the present invention is simple and has higher stability, which can avoid the problem that the latch assembly cannot operate normally due to poor assembly or component dimensional tolerances.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A latch assembly, comprising:
- a latch bolt module, comprising:
  - a latch bolt cylinder;
  - a latch bolt movably arranged on the latch bolt cylinder along an axial direction of the latch bolt cylinder;
  - a connecting plate connected to the latch bolt; and
  - a linkage piece engaged with the connecting plate and formed with a notch, wherein one end of the linkage piece is configured to abut against the latch bolt cylinder;
- a driving module, comprising:
  - a driving plate configured to abut against the linkage piece;
  - a driving member formed with a driving shaft hole to allow a driving shaft to penetrate through; and
  - a housing connected to the latch bolt cylinder and configured to accommodate the driving plate and the driving member, wherein the housing has a first covering plate and a second covering plate, one end of a main body of the first covering plate is formed with an extension structure, and the extension structure comprises a first extension section bent at a predetermined angle greater than zero degrees relative to the main body of the first covering plate to be away from the driving plate and configured to pass through the notch, and a second extension section extended toward the latch bolt from the first extension section along the axial direction of the latch bolt cylinder; and an elastic member sleeved on the second extension section and configured to abut against the latch bolt and the housing, wherein when the driving member is driven by the driving shaft to rotate, the driving plate is moved to drive the linkage piece to swing, such that the linkage piece is configured to drive the latch bolt to move relative to the latch bolt cylinder from an extended position to a retracted position through the connecting plate.

2. The latch assembly of claim 1, wherein the first extension section is configured to abut against a bottom of the notch.

3. The latch assembly of claim 1, wherein the predetermined angle is between 2 degrees and 5 degrees.

4. The latch assembly of claim 1, wherein the elastic member is a spindle-shaped spring.

5. The latch assembly of claim 1, wherein the connecting plate is formed with a V-shaped notch configured to be engaged with the latch bolt.

6. The latch assembly of claim 1, wherein the connecting plate has a first side and a second side opposite to each other, the first side faces towards the driving plate and is formed with a protruded structure, and the second side is formed with a recessed structure.

7. The latch assembly of claim 1, wherein the second covering plate is formed with at least one groove, the driving plate has at least one first pushed structure and at least one second pushed structure configured to abut against the at least one groove; wherein when the driving member is located at a first driving position relative to the housing and when the driving member is rotated, the driving member is configured to push the first pushed structure to move the driving plate; wherein when the driving member is located at a second driving position relative to the housing and when the driving member is rotated, the driving member is configured to push the second pushed structure to move the driving plate.

8. The latch assembly of claim 7, further comprising an extension housing movably arranged on the housing and configured to move the driving member relative to the housing between the first driving position and the second driving position; wherein the housing is formed with at least one first positioning structure and at least one second positioning structure, the extension housing is formed with at least one extension positioning structure; wherein when the driving member is located at the first driving position relative to the driving plate, the first positioning structure is configured to be engaged with the extension positioning structure; wherein when the driving member is located at the second driving position relative to the driving plate, the second positioning structure is configured to be engaged with the extension positioning structure.

9. The latch assembly of claim 7, wherein the second covering plate is formed with an opening, a hole wall of the opening is formed with a guiding structure; wherein when the driving member is at an initial angle relative to the guiding structure, the driving member is movable between the first driving position and the second driving position relative to the housing; wherein when the driving member is not at the initial angle relative to the guiding structure, the driving member is configured to be blocked by the guiding structure to prevent the driving member from being moved between the first driving position and the second driving position relative to the housing.

10. The latch assembly of claim 1, wherein the latch bolt module further comprises:

an anti-theft bolt movable relative to the latch bolt, the anti-theft bolt is formed with a rectangular groove;

a blocking member formed with a rectangular opening;

an anti-theft spring having two opposite ends respectively abutting against the anti-theft bolt and the blocking member; and a positioning pin having a rectangular cross-section corresponding to the rectangular groove and the rectangular opening, wherein the positioning pin is configured to pass through the rectangular opening;

wherein when the anti-theft bolt is moved to a predetermined position relative to the latch bolt, the blocking member is configured to swing to prevent the latch bolt from being moved from the extended position to the retracted position relative to the latch bolt cylinder.

11. A latch assembly, comprising:

a latch bolt module, comprising:

a latch bolt cylinder;

a latch bolt movably arranged on the latch bolt cylinder along an axial direction of the latch bolt cylinder;

a connecting plate connected to the latch bolt; and a linkage piece engaged with the connecting plate and formed with a notch, wherein one end of the linkage piece is configured to abut against the latch bolt cylinder; and a driving module, comprising:

a driving plate configured to abut against the linkage piece;

a driving member formed with a driving shaft hole to allow a driving shaft to penetrate through; and a housing connected to the latch bolt cylinder and configured to accommodate the driving plate and the driving member, wherein the housing has a first covering plate and a second covering plate, one end of a main body of the first covering plate is formed with an extension structure bent at a predetermined angle relative to the main body of the first covering plate and configured to pass through the notch, wherein when the driving member is driven by the driving shaft to rotate, the driving plate is moved to drive the linkage piece to swing, such that the linkage piece is configured to drive the latch bolt to move relative to the latch bolt cylinder from an extended position to a retracted position through the connecting plate, wherein the second covering plate is formed with at least one groove, the driving plate has at least one first pushed structure and at least one second pushed structure configured to abut against the at least one groove; wherein when the driving member is located at a first driving position relative to the housing and when the driving member is rotated, the driving member is configured to push the first pushed structure to move the driving plate; wherein when the driving member is located at a second driving position relative to the housing and when the driving member is rotated, the driving member is configured to push the second pushed structure to move the driving plate, wherein the second covering plate is formed with an opening, a hole wall of the opening is formed with a guiding structure; wherein when the driving member is at an initial angle relative to the guiding structure, the driving member is movable between the first driving position and the second driving position relative to the housing, and wherein when the driving member is not at the initial angle relative to the guiding structure, the driving member is configured to be blocked by the guiding structure to prevent the driving member from being moved between the first driving position and the second driving position relative to the housing.

12. A latch assembly, comprising:

a latch bolt module, comprising:

a latch bolt cylinder;

a latch bolt movably arranged on the latch bolt cylinder along an axial direction of the latch bolt cylinder;

a connecting plate connected to the latch bolt;

a linkage piece engaged with the connecting plate and formed with a notch, wherein one end of the linkage piece is configured to abut against the latch bolt cylinder;

an anti-theft bolt movable relative to the latch bolt, wherein the anti-theft bolt is formed with a rectangular groove;

a blocking member formed with a rectangular opening;

an anti-theft spring having two opposite ends respectively abutting against the anti-theft bolt and the blocking member; and a positioning pin having a rectangular cross-section corresponding to the rectangular groove and the rectangular opening, wherein the positioning pin is configured to pass through the rectangular opening; and a driving module, comprising:

a driving plate configured to abut against the linkage piece;

a driving member formed with a driving shaft hole to allow a driving shaft to penetrate through; and a housing connected to the latch bolt cylinder and configured to accommodate the driving plate and the driving member, wherein the housing has a first covering plate and a second covering plate, one end of a main body of the first covering plate is formed with an extension structure bent at a predetermined angle relative to the main body of the first covering plate and configured to pass through the notch, wherein when the driving member is driven by the driving shaft to rotate, the driving plate is moved to drive the linkage piece to swing, such that the linkage piece is configured to drive the latch bolt to move relative to the latch bolt cylinder from an extended position to a retracted position through the connecting plate, and wherein when the anti-theft bolt is moved to a predetermined position relative to the latch bolt, the blocking member is configured to swing to prevent the latch bolt from being moved from the extended position to the retracted position relative to the latch bolt cylinder.

* * * * *